Patented Sept. 6, 1949

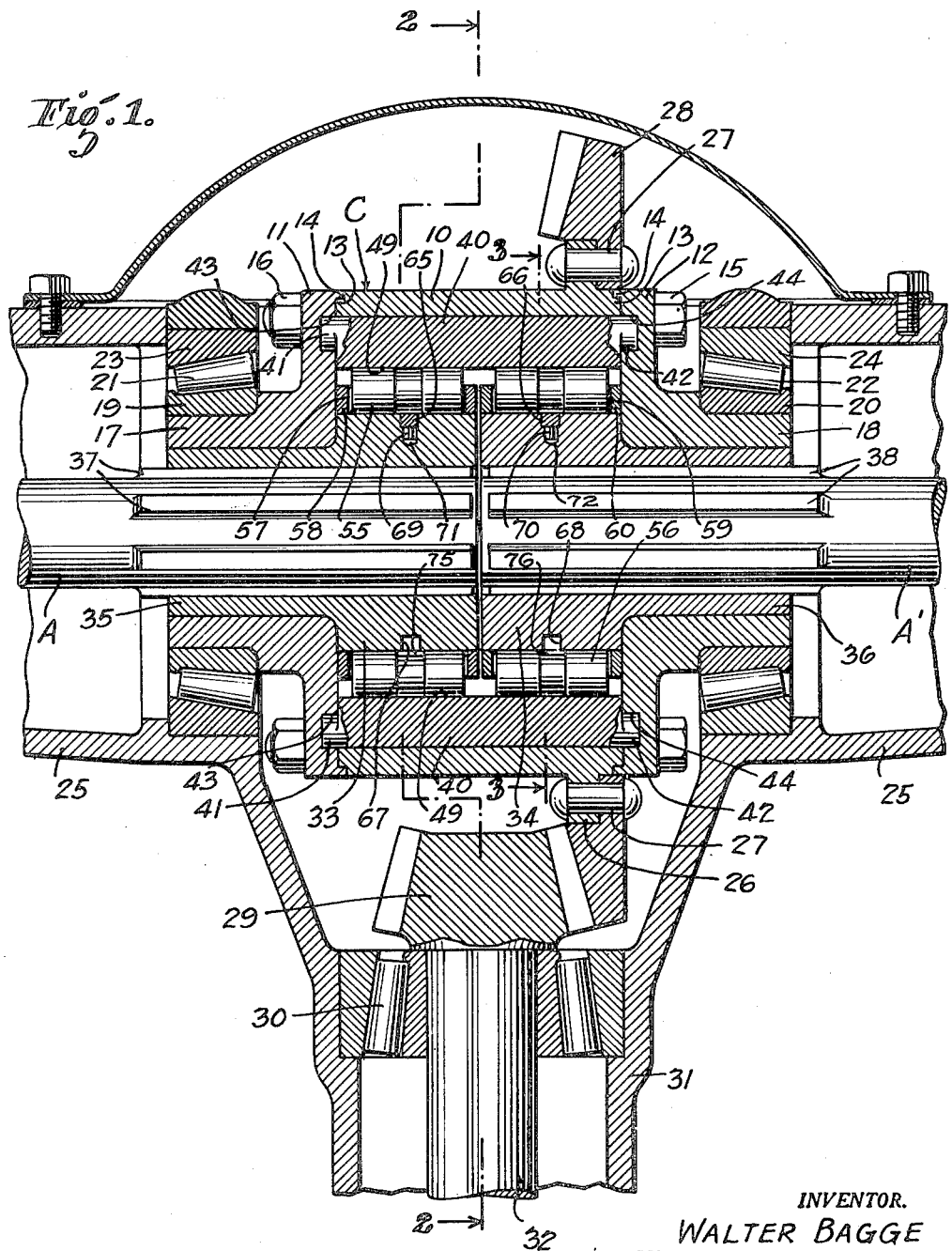

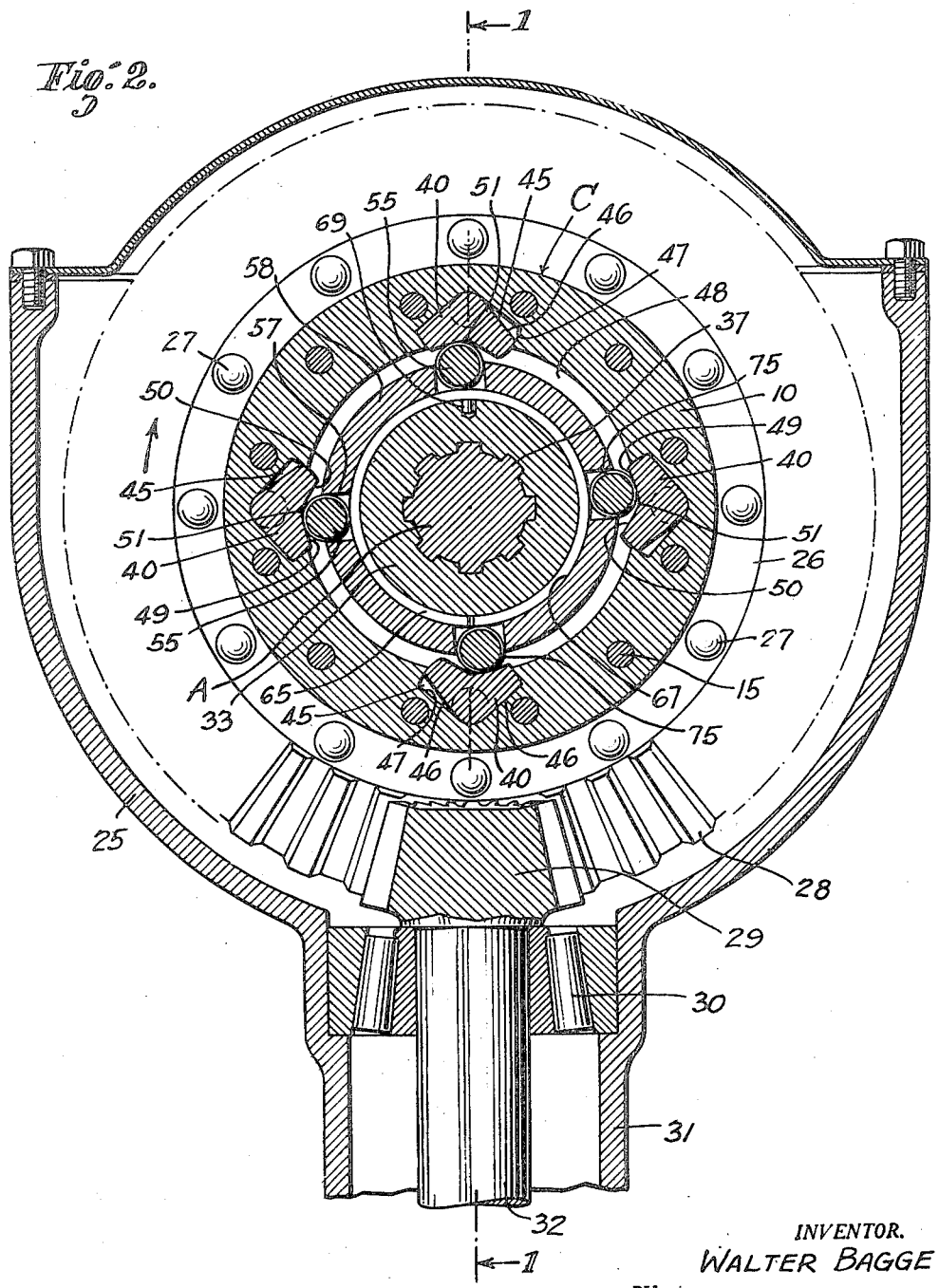

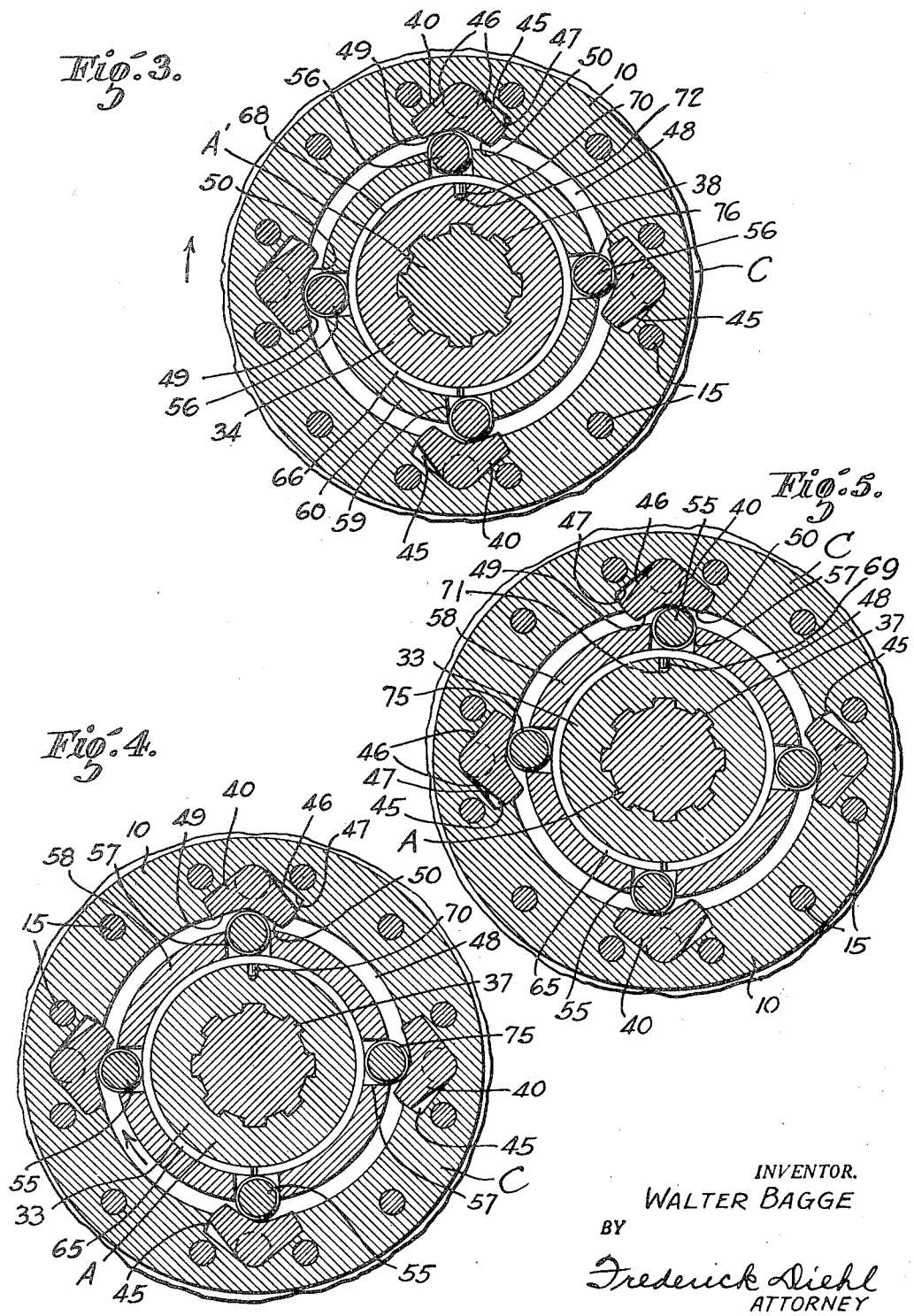

2,481,066

UNITED STATES PATENT OFFICE 2,481,066

AUTOMATIC POWER LOCKING DIFFERENTIAL DRIVING MECHANISM

Walter Bagge, Los Angeles, Calif., assignor, by direct and mesne assignments, to Hughes Tool Company, Culver City, Calif., a corporation of Delaware Application March 19, 1948, Serial No. 15,828

10 Claims. (Cl. 74—650)

My invention relates to power transmission mechanism, and more particularly to such mechanisms of the differential type as applied to motor vehicles and other machines.

An object of my invention is to provide an automatic power locking differential driving mechanism which is structurally characterized by the absence of relatively expensive differential gearing, and the substitution therefor of means effecting a one hundred percent differential drive, which, in its application to a motor vehicle, is absolutely positive in driving the right and left wheels in both forward and reverse directions, and which delivers the power to either wheel should the other wheel have less or no traction, in contrast to the conventional type of differential mechanism in which the wheel having the less traction receives the power, which thus is wasted.

Another object of my invention is to provide an automatic power locking differential driving mechanism of the above described character which renders the vehicle inherently stable at all speeds by preventing side sway and wandering movements; which is a powerful automatic aid in restoring the vehicle to a straight course following a turn, irrespective of whether the turn is made to the right or left under power or when coasting, all to the end of precluding, if not absolutely preventing spinning or skidding of the vehicle on the road irrespective of road conditions.

A further object of my invention is to provide a mechanism of the above described character, which, in its application to a motor vehicle, is operable to drive the right and left wheels independently of each other during straightahead, turning and curving movements of the vehicle, or when the vehicle is traveling on muddy, icy, or snow laden roads, all while insuring a full and complete differential action of the wheels when the vehicle is traveling other than a straightahead course, and with the added advantage that should either the right or left axel section of the divided wheel axel break, the other axel section will propell the vehicle so as to enable same to continue traveling in a normal manner until repairs can be made, rather than be stalled on the road as would be the case under similar conditions with the conventional gear type of differential mechanism in universal use.

With these and other objects in view, my invention resides in the combinations, arrangements and functional relationships of elements as set forth in the following specification and particularly pointed out in the appended claims.

In the accompanying drawings,

Figure 1 is a horizontal longitudinal sectional view taken on the line 1—1 of Figure 2, and showing one form of automatic power locking differential driving mechanism embodying my invention;

Figure 2 is a transverse sectional view taken on the line 2—2 of Figure 1;

Figure 3 is a fragmentary transverse sectional view taken on the line 3—3 of Figure 2; and Figures 4 and 5 are sectional views similar to Figure 3, and illustrating different positions of the working parts of the invention.

Referring specifically to the drawings, my invention in its illustrated embodiment comprises a support in the form of a cylindrical case C composed of an annular body section 10 and end sections 11 and 12 closing the ends of the body section, the body and end sections having interfitting centering flanges 13 and 14, respectively. Bolts 15 extend through registering openings at circumferentially spaced intervals in the body and end sections, and are provided with nuts 16 to rigidly secure the sections together.

The end sections 11 and 12 are provided with tubular mounting extensions 17 and 18, respectively, for the inner races 19 and 20 of anti-friction bearings 21 and 22, whose outer races 23 and 24 are rigidly supported in the housing 25, which, in the present instance is assumed to be the rear axel housing of a motor vehicle, all to the end of rotatably mounting the case C in such housing.

The body section 10 of the case C is provided with a flange 26 to which is rigidly secured coaxially of the case by rivets 27, a ring gear 28. The gear 28 constantly meshes with and is driven by a driving pinion gear 29 journaled in an antifriction bearing 30 in the forward tubular extension 31 of the axel housing 25, and fixed to the usual propeller shaft 32.

Right and left driven members 33 and 34, respectively, in the form of cylindrical tubular bodies, are arranged in end to end relation within the body section 10 of the case C to co-act in spanning the length of this section, and are provided with diametrically reduced extensions 35 and 36 journaled, respectively, in the extensions 17 and 18 of the respective end sections 11 and 12. Extending into the driven members 33 and 34 and having splined connections 37 and 38 therewith, are the inner ends of independently rotatable shafts, which, in the illustrated embodiment of my invention, constitute the right and left axle sections A and A' of a divided wheel axle.

Driving elements 40 or cams, of which four are shown in the present instance, are mounted in the case C at equally spaced intervals circumferentially thereof, and are in the form of hardened metal bars co-extensive in length with the body section 10 of the case. At the ends of the driving elements 40 are trunnions 41 and 42 which are journaled in bearings 43 and 44 in the end sections 11 and 12, respectively, to mount the elements in recesses 45 in the body section 10 for oscillating movement from the extreme position shown in Figure 2 to the extreme position shown in Figure 5. This movement of the driving elements is definitely limited by engagement of flat stop faces 46 on the elements with the flat bottom wall portions 47 of the recesses which form solid seats for the elements.

Between the internal annular wall of the body section 10 and the peripheries of the driven members 33 and 34 an annular chamber 48 is formed, and into which the driving elements 40 project. These projecting portions of the driving elements are provided with working or wedge cam faces 49 and 50 co-extensive in length with the elements and relatively diverging at equal angles from a central apex 51, for alternate co-action of the working faces with two separate operative connections in the form of sets of rollers 55 and 56, to drive the respective axle sections A and A', or free same for differential movements.

The rollers 55 are confined in slots 57 in a cylindrical cage 58 rotatably mounted on the driven member 33 for the right axle section A, whereas the rollers 56 are confined in slots 59 of a similar cage 60 rotatably mounted on the driven member 34 for the left axle section A', all as clearly shown in Figures 1, 2 and 3.

Friction drag devices, one for each operative connection formed by a set of the rollers 55 and 56 are provided. These devices are in the form of split, spring rings 65 and 66 working in annular grooves 67 and 68 in the respective driven members 33 and 34, and compelled to rotate therewith by pins 69 and 70 seating in radial bores 71 and 72 in the driven members. The rings 65 and 66 are normally expanded against the internal annular surfaces of the respective cages 58 and 60. The rollers 55 and 56 are provided with annular recesses 75 and 76, respectively, directly opposite the respective spring rings 65 and 66, so as to be clear of the braking effect of the rings upon the cages 58 and 60 in the operation of the invention which is as follows:

Let it be assumed that a mechanism embodying my invention is installed in a motor vehicle, and that power is being applied to the propeller shaft 32 to drive the ring gear 28 and hence the case C through the pinion gear 29, in a direction to drive the vehicle forwardly, which corresponds to the clockwise direction of rotation of the case as indicated by the arrows in Figures 2 and 3. With the vehicle traveling straight ahead and with the right and left wheels having equal traction on the road, the driving elements 40 will occupy the extreme position shown in Figures 2 and 3, in which the sets of rollers 55 and 56 will be wedged by the working faces 49 of the driving elements against the peripheries of the respective driven members 33 and 34, so as to positively drive same and hence the right and left wheels at one and the same speed.

However, upon executing a left turn under power, for example, the left wheel will be positively driven through the rollers 56 as shown in Figure 3, whereas the faster traveling right wheel which now requires a differential action, will, through the faster traveling right driven member 33, cause the ring 65 to drag the cage 58 therewith through a sufficient angular distance in the clockwise direction shown by the arrow in Figure 4, for the rollers 55 to be disengaged from their wedge driving relationship against the working surfaces 49 of the driving elements 40, and to be moved to the idle position shown in this figure, and wherein the movement of the cage 58 by the ring 65 will be stopped by non-wedging engagement of the rollers 55 with the working surfaces 50 of the driving elements.

It will be clear that the angle presented by the working surfaces 50 to the rollers 55 is too steep to obtain the wedging or locking action which these rollers previously had with the other working surfaces 49, in this extreme position of the driving elements 40, and that therefore the driven member 33 will rotate freely in the bearing 18 of the case C with a true differential action irrespective of the radius of the turn.

Upon executing a right turn under power, the right wheel will now be positively driven through the rollers 55, as shown in Figure 2, whereas the faster traveling left wheel which now requires the differential action, will, through the faster traveling left driven member 34, cause the ring 66 to drag the cage 60 therewith through a sufficient angular distance for the rollers 56 to be disengaged from their wedged driving relationship against the working surfaces 49 of the driving elements 40, and to be moved to their idle position corresponding to that position previously occupied by the rollers 55 in executing a left turn under power, so that the driven member 34 will rotate freely in the bearing 17 of the case C with a true differential action irrespective of the radius of the turn.

Should the power be removed from the propeller shaft 32 during straightahead travel of the vehicle, and the wheels be driving the driven members 33 and 34 through the respective axle sections A and A', the cages 58 and 60 will be dragged by the respective friction rings 65 and 66 to cause the rollers 55 and 56 to shift the driving elements 40 to their other extreme position shown in Figure 5, and then lock against the working surfaces 50 of the driving elements as shown in this figure, so as to maintain the positive driving connection to the propeller shaft 32. Should the power be removed from the propeller shaft when executing a right or left turn, the faster traveling outside wheel on the turn will cause the rollers 55 or 56 as the case may be, to shift the driving elements 40 to the position of Figure 5, and to lock against the working surfaces 50 of the elements, whereas the other rollers will remain in their idle position so that a true differential action will be imparted to the inside wheel irrespective of the radius of the turn.

The same differential action will be obtained when backing the vehicle with or without power, either in a straight course or when executing turns. Should either wheel be stuck in a rut, or be under any road condition in which one wheel has greater traction than the other, the driving elements 40 and the set of rollers 55 or 56 as the case may be, will co-act with the respective driven member 33 or 34, to automatically lock the wheel having the greater traction, to the propeller shaft when being driven, until the traction of both wheels is equalized, rather than waste the power on the wheel having less traction as is the function of conventional differential mechanisms now in common use.

I claim:
1. Automatic power locking differential driving mechanism comprising: two co-axially arranged, rotatably mounted driven members having peripheral surfaces; a support rotatably mounted co-axially of said members; a driving element common to said driven members and having two working surfaces; means pivotally mounting said driving element on said support about a fixed axis laterally offset from and parallel to the axis of said driven members, for swinging movement of the driving element in one direction or the other, to accordingly dispose one of said working surfaces in an active wedging relationship to said peripheral surfaces of said driven members in one direction circumferentially thereof, or to dispose the other of said working surfaces in an active wedging relationship to said peripheral surfaces of said driven members in the opposite direction circumferentially thereof; rollers for each of said driven members; and means mounting said rollers on said driven members to co-act with one working surface or the other in establishing a wedged driving connection between the support and the respective driven members in one direction of rotation of the support or the other; said working surfaces being in such angular relationship that when either of such surfaces is in active wedging relationship to the peripheral surfaces of said driven members, to establish said driving connection, the other of the working surfaces will be incapable of co-acting with the rollers in establishing said driving connection, whereby to permit differential rotation of the driven members in either direction.

2. Automatic power locking differential driving mechanism comprising: two co-axially arranged, rotatably mounted driven members having peripheral surfaces; a support rotatably mounted co-axially of said members; a driving element common to said driven members and having two working surfaces; means pivotally mounting said driving element on said support about a fixed axis laterally offset from and parallel to the axis of said driven members, for swinging movement of the driving element in one direction or the other, to accordingly dispose one of said working surfaces in an active wedging relationship to said peripheral surfaces of said driven members in one direction circumferentially thereof, or to dispose the other of said working surfaces in an active wedging relationship to said peripheral surfaces of said driven members in the opposite direction circumferentially thereof; rollers for each of said driven members; means mounting said rollers on said driven members to co-act with one working surface or the other in establishing a wedged driving connection between the support and the respective driven members in one direction of rotation of the support or the other; and means for creating sufficient friction between the peripheral surfaces of the driven members and said roller mounting means, for the latter to be shifted circumferentially by said driven members and cause the rollers to move said driving element in one direction or the other, according as power is being applied to or removed from said support.

3. Automatic power locking differential driving mechanism comprising: two co-axially arranged, rotatably mounted driven members having peripheral surfaces; a support rotatably mounted co-axially of said members; a driving element common to said driven members and having two working surfaces; means pivotally mounting said driving element on said support about a fixed axis laterally offset from and parallel to the axis of said driven members, for swinging movement of the driving element in one direction or the other, to accordingly dispose one of said working surfaces in an active wedging relationship to said peripheral surfaces of said driven members in one direction circumferentially thereof, or to dispose the other of said working surfaces in an active wedging relationship to said pepheral surfaces of said driven members in the opposite direction circumferentially thereof; rollers for each of said driven members; means mounting said rollers on the peripheral surfaces of said driven members to co-act with one working surface or the other in establishing a wedged driving connection between the support and the respective driven members in one direction of rotation of the support or the other; and means responsive to driving of said support in one direction or the other, to shift said roller mounting means circumferentially, for said rollers to move said driving element in one direction or the other, so as to reverse the direction of the driving connection created by the rollers between the support and the respective driven members.

4. Automatic power locking differential driving mechanism comprising: two co-axially arranged, rotatably mounted driven members having peripheral surfaces; a support rotatably mounted co-axially of said members; a driving element common to said driven members and having two working surfaces; means mounting said driving element on said support for movement of the driving element relative to the support in one direction or the opposite direction, to accordingly dispose one of said working surfaces in an active wedging relationship to said peripheral surfaces of said driven members in one direction circumferentially thereof, or to dispose the other of said working surfaces in an active wedging relationship to said peripheral surfaces of said driven members in the opposite direction circumferentially thereof; rollers for each of said driven members; means mounting said rollers on said peripheral surfaces of said driven members to co-act with one working surface or the other in establishing a wedged driving connection between the support and the respective driven members in one direction of rotation of the support or the other; and spring rings interposed between said driven members and roller mounting means for co-action therewith in shifting the latter circumferentially so as to cause the rollers to move said driving element in one direction or the other, according as said support is being driven in one direction or the other.

5. Automatic power locking differential driving mechanism comprising: co-axially arranged, rotatably mounted driven members having peripheral surfaces; a support rotatably mounted co-axially of said members; a driving element having a plurality of working surfaces common to both of said driven members; rollers interposed between the peripheral surfaces of said driven members and the working surfaces of said driving element; and means pivotally mounting said driving element on the support about a fixed axis on the latter which is laterally offset from and parallel to the axis of said driven members for coaction of one of said working surfaces or the other with said rollers in accordingly establishing a driving connection between the support and the respective driven members in one direction of rotation or the other.

6. Automatic power locking differential driving mechanism comprising: co-axially arranged, rotatably mounted driven members having peripheral surfaces; a support rotatably mounted co-axially of said members; a driving element having a plurality of working surfaces common to both of said driven members; rollers interposed between the peripheral surfaces of said driven members and the working surfaces of said driving element; means pivotally mounting said driving element on the support about an axis offset laterally from the axis of said driven members, for swinging movement of the driving element in one direction or the other, to accordingly cause one or the other of said working surfaces to co-act with the respective rollers in establishing a driving connection between the support and the respective driven members in one direction of rotation or the other; and means mounting said rollers on the peripheral surfaces of said driven members for sufficient movement circumferentially with the latter, to co-act with the working surfaces of the driving element in swinging the latter in one direction or to the other so as to establish said driving connection as aforestated.

7. Automatic power locking differential driving mechanism comprising: co-axially arranged, rotatably mounted driven members having peripheral surfaces; a support rotatably mounted co-axially of said members; a driving element having a plurality of working surfaces common to said driven members; rollers interposed between the peripheral surfaces of said driven members and the working surfaces of said driving element; means pivotally mounting said driving element on the support about an axis offset laterally from the axis of said driven members, for swinging movement of the driving element in one direction or the other to accordingly cause one or the other of said working surfaces to co-act with the respective rollers in establishing a driving connection between the support and the respective driven members in one direction of rotation or the other; cages mounting said rollers on the peripheral surfaces of the respective driven members; and friction devices, one for each cage, co-acting with the respective cages and the peripheral surfaces of the respective driven members to effect circumferential movement of the cages by the driven members, for the rollers to move the driving element in one of said directions or the other.

8. Automatic power locking differential driving mechanism comprising: co-axially arranged, rotatably mounted driven members having peripheral surfaces; a support rotatably mounted co-axially of said members; a driving element having a plurality of working surfaces common to said driven members; rollers interposed between the peripheral surfaces of said driven members and the working surfaces of said driving element; means pivotally mounting said driving element on the support about an axis offset laterally from the axis of said driven members, for swinging movement of the driving element in one direction or the other to accordingly cause the rollers to become wedged between the peripheral surfaces of the respective driven members and one working surface or the other of said driving element, so as to establish a driving connection between the support and either driven member in one direction of rotation or the other, while leaving the other driven member free for differential movement.

9. Automatic power locking differential driving mechanism comprising: a rotatably mounted case; driven members having peripheral surfaces and being rotatably mounted in end to end relationship co-axially in said case; driving cams having trunnions by which the cams are pivotally mounted in the case at circumferentially spaced locations, each of said driving cams having alternately operable working surfaces in angular relationship to each other; rollers for each driven member; and means mounting said rollers between the peripheral surfaces of the driven members and the working surfaces of each driving cam, for wedging co-action with one or the other of such working surfaces and the peripheral surfaces of the respective driven members in accordingly driving them in one direction or the other.

10. Automatic power locking differential driving mechanism comprising: a rotatably mounted case; driven members having peripheral surfaces and being rotatably mounted in end to end relationship co-axially in said case; driving cams having trunnions by which the cams are pivotally mounted in the case at circumferentially spaced locations, each of said driving cams having alternately operable working surfaces in angular relationship to each other; rollers for each driven member; cages mounting the rollers on the respective driven members for a wedged driving co-action with one working surface or the other of each cam, to accordingly drive the respective driven member on one direction or the other; and friction devices co-acting with said cages and driven members to cause the rollers to swing the cams in one direction or the other according as relative rotation between the support and driven members is effected in one direction or the other.

WALTER BAGGE.

REFERENCES CITED

The following references are of record in the file of this patent:

UNITED STATES PATENTS

| Number | Name | Date |
| --- | --- | --- |
| 1,237,018 | Code | Aug. 14, 1917 |
| 1,320,979 | Bowen | Nov. 4, 1919 |
| 1,443,448 | Wiora | Jan. 30, 1923 |
| 1,651,228 | Ross | Nov. 29, 1927 |
| 1,902,449 | Hughes | Mar. 21, 1933 |